Nov. 10, 1936.   R. HAARDT   2,060,777

GLOBE WITH MEASURING INSTRUMENT

Filed June 12, 1936

Patented Nov. 10, 1936

2,060,777

UNITED STATES PATENT OFFICE 2,060,777

GLOBE WITH MEASURING INSTRUMENT

Robert Haardt, Vienna, Austria

Application June 12, 1936, Serial No. 84,856
In Austria June 8, 1935

4 Claims. (Cl. 35—46)

This invention relates to a globe with a measuring instrument which renders it possible to make terrestrial or celestial measurements in a simple manner, such for instance as the distance between any two points on the earth and which is also suitable for measuring and estimating the size of areas on the earth's surface.

The invention consists of a cup-shaped base for the globe open at both ends and in which the globe is rotatably mounted, and of a graduated arcuate rule connected with the cup-shaped base and having an internal diameter corresponding to that of the globe. The base is preferably constructed as a hollow truncated cone on the inner surface of which a scale is marked and having slots for accommodating the arcuate rule.

An embodiment of the invention is illustrated by way of example in the accompanying drawing in which:—

Figure 1:
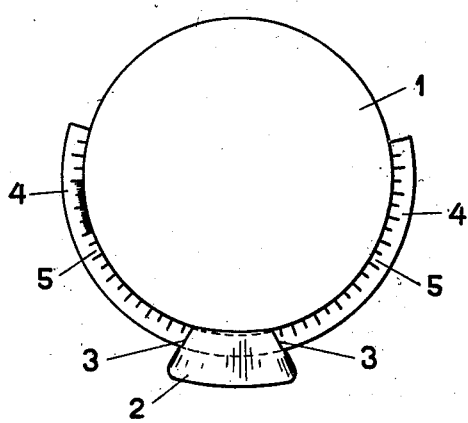
Fig. 1 shows in elevation the globe with the measuring device.

The globe 1 is mounted in a cup-shaped base 2 open at both ends. This base is constructed in the example illustrated as a hollow truncated cone supporting the globe so that it can turn freely in any direction (Fig. 1). The base 2 has in its upper edge two diametrically opposite slots 3 through which an arcuate flat rule 4 standing on edge extends. The internal diameter of this rule 4, which is preferably longer than a semi-circle, corresponds accurately to the diameter of the globe. A scale 5 for measuring distances is provided on one or both side faces of the rule. The inner surface of the base 2 also has a scale 6 along the inner edge. If it is desired to measure the distance between any two points on the earth, the globe 1 is turned on the base 2 so that the two points, the distance of which has to be determined, are situated in the plane of the arcuate rule 4. As this rule is always held by the base along a large circle of the globe, the aerial distance between the two points can thus be read directly and in the case of ship routes the actual distances can easily be calculated.

Figure 2:
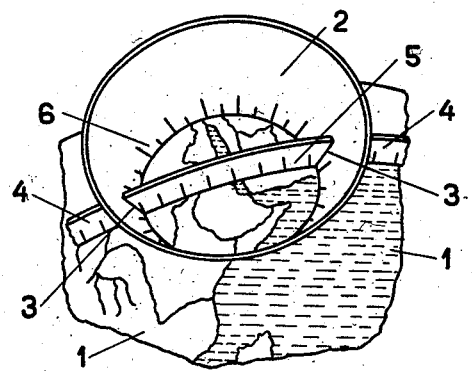
Fig. 2 is a perspective view on larger scale showing how the base is used for measuring distances or areas.

The instrument may be used also in such a manner that the smaller edge of the base can be placed on a corresponding point of the globe, as shown in Fig. 2. In this manner the distance between two points of the area of the surface bordered by this edge of the base 2 can be measured by the scale 6, or the size of any portions within this area can be estimated.

I claim:—

1. A globe of the character described, comprising in combination, a cup-shaped base open at both ends, a globe supported in one open end of the base so that it can be freely rotated in any direction, and an arcuate rule carried by the end of the base supporting the globe and having an inner diameter corresponding to the diameter of the globe, the rule being of a length to retain the globe supported on the base.

2. A globe with measuring instrument as specified in claim 1, in which the base is constructed substantially as a hollow truncated cone with the globe on the smaller end of the cone.

3. A globe with measuring instrument as specified in claim 1, in which a scale is marked on the inner surface of the cup-shaped base adjacent the end supporting the globe.

4. A globe with measuring instrument as specified in claim 1, in which the arcuate rule extends through slots in the edge of the cup-shaped base.

ROBERT HAARDT.